United States Patent [19]

Sakurai

[11] Patent Number: 4,941,522
[45] Date of Patent: Jul. 17, 1990

[54] TIRE

[75] Inventor: Mitsuo Sakurai, Hiratsuka, Japan

[73] Assignee: The Yokohama Rubber Co., Ltd., Tokyo, Japan

[21] Appl. No.: 253,452

[22] Filed: Oct. 5, 1988

Related U.S. Application Data

[63] Continuation-in-part of Ser. No. 119,456, Nov. 10, 1987, abandoned.

[30] Foreign Application Priority Data

Nov. 17, 1986 [JP] Japan .................................. 61-175331

[51] Int. Cl.$^5$ .............................................. B60C 13/02
[52] U.S. Cl. ................................... 152/523; 152/524; 235/462
[58] Field of Search ................ 152/523, 524; 235/462, 235/463, 454, 490

[56] References Cited

U.S. PATENT DOCUMENTS

| | | | |
|---|---|---|---|
| 3,497,576 | 2/1970 | Dvorin | 235/462 X |
| 3,930,141 | 12/1975 | Koyama et al. | 152/523 X |
| 4,625,101 | 11/1986 | Hinks et al. | 152/523 X |

FOREIGN PATENT DOCUMENTS

| | | | |
|---|---|---|---|
| 3141461 | 6/1982 | Fed. Rep. of Germany | 152/523 |
| 3333149 | 3/1985 | Fed. Rep. of Germany | 152/523 |
| 58-36709 | 3/1983 | Japan | 152/523 |
| 58-36710 | 3/1983 | Japan | 152/523 |

Primary Examiner—Raymond Hoch
Attorney, Agent, or Firm—Armstrong, Nikaido, Marmelstein, Kubovcik & Murray

[57] ABSTRACT

A tire having a bar code provided in a side portion thereof, with the bar code having an uneven bar portion extending to both side edges of the bar code and substantially no difference in level between the surface of the side portion of the tire and peaks of the uneven bars in the uneven bar portion.

2 Claims, 2 Drawing Sheets

TIRE

This application is a continuation-in-part of Application Serial No. 119,456, filed Nov. 10, 1987, now abandoned.

BACKGROUND OF THE INVENTION

This invention relates to a tire provided with a bar code on the side thereof and having an excellent weather resistance.

Hitherto, a bar code has been provided on various articles in order to input various information thereinto and output the information therefrom according to need.

With respect to a tire, a bar code may be often provided on the side thereof for the purpose of differentiating tires. The bar code can be provided on the side of the tire by for example mounting a bar code marking plate on the inside of a vulcanization mold (die surface), bringing the side of a green tire into contact with the plate and then vulcanizing the tire.

However, when the bar code is provided on the side of the tire, a stress is concentrated on a flat portion located between one end of an uneven bar portion of the bar code and one side edge of the bar code (i.e., a portion corresponding to the space portion of the bar code marking plate) and on another flat portion located between the other end of the uneven bar portion of the bar code and the other side edge of the bar code. This brings about deterioration of the weather resistance of the tire (particularly static ozone resistance at a low temperature of, e.g., 0° C.) at these flat portions, which unfavorably leads to the occurrence of cracking at these portions.

SUMMARY OF THE INVENTION

An object of the present invention is to provide a tire provided with a bar code on the side thereof which is free from the above-mentioned concentration of a stress and, therefore, has an excellent weather resistance.

In order to attain the above-mentioned object, the tire of the present invention comprises a bar code provided on the side of a tire, wherein said bar code has an uneven bar portion extending to both side edges of said bar code and the surface of the side portion of the tire is substantially flush with peaks of the uneven bars in the uneven bar portion. The bar code is also provided in an elongate form having a pair of arc-shaped side edges joined by semi-circular ends.

The foregoing and other objects and features of the present invention will be apparent from the following description.

DETAILED DESCRIPTION OF THE PREFERRED EMBODIMENT

Figure 3:
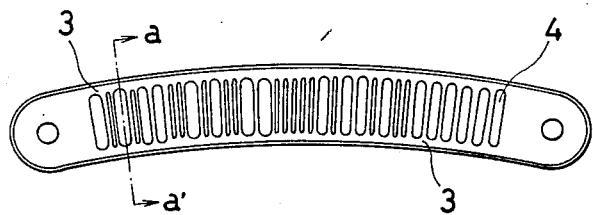
FIG. 3 is a plan view of an example of a conventional bar code marking plate.
Figure 4A:
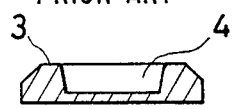
FIGS. 4(A), (B), and (C) are examples of a cross-section taken along line a-a' of FIG. 3.
Figure 5:
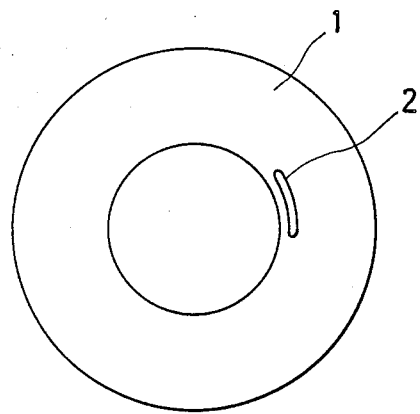
FIG. 5 is an illustrative view showing the side of a tire.

As shown in FIG. 5, the tire is provided with a bar code 2 on the side 1 thereof for the purpose of differentiating tires. An example of a conventional bar code marking plate for use in providing the bar code 2 is shown in FIG. 3. In FIG. 3, numeral 3 designates a space portion, and numeral 4 an uneven bar portion. As can be seen from FIG. 3, the conventional bar code marking plate has space portions 3 both between one end of the uneven bar portion 4 and one side edge of the plate and between the other end of the uneven bar portion 4 and the other side edge of the plate. For this reason, as mentioned above, the provision of the bar code 2 on the side 1 of the tire by making use of the conventional bar code marking plate brings about cracking at a portion corresponding to the space portion 3, i.e., flat portion. Examples of a crosssection taken along line a-a' of FIG. 3 are shown in FIGS. 4(A), (B), and (C). The width of the space portion 3 increases in the order of the crosssections of FIGS. 4(A), (B), and (C).

Figure 1:
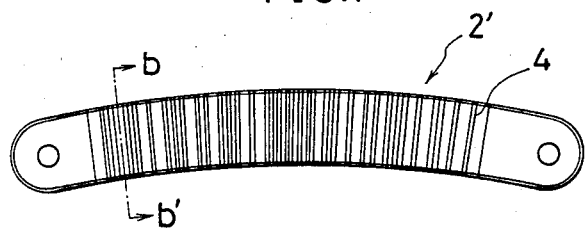
FIG. 1 is a plan view of an example of a bar code marking plate used in the present invention.
Figure 2A:
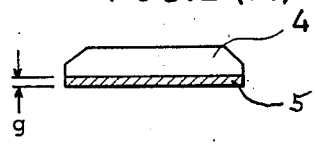
FIGS. 2(A), (B), and (C) are examples of a cross-section taken along line b-b' of FIG. 1.
Figure 2B:
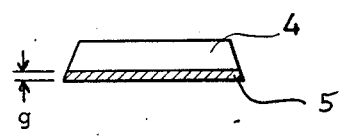
Figure 2C:
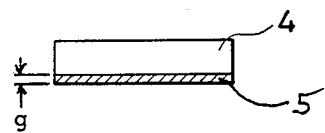

On the other hand, the present invention uses a bar code marking plate 2' as shown in FIG. 1. In the bar code marking plate 2', the uneven bar portion 4 extends to both side edges of the bar code. The shape of the crosssection of the uneven bar portion 4 may be any of e.g., those as shown in FIGS. 2(A), (B), and (C). FIGS. 2(A) and (B) show crosssections in the case where chamfering was conducted at different angles, while FIG. 2(C) shows a crosssection in the case where no chamfering was conducted.

When the bar code 2 is marked on the side 1 of a tire using the bar code marking plate 2', no portion corresponding to the space portion as shown in FIG. 3 is formed on the side 1 of the tire because the uneven bar portion of the bar code 2 extends to both side edges of the bar code 2, which prevents the occurrence of the concentration of a stress and, therefore, occurrence of cracking.

Also, in the bar code according to the present invention, there is substantially no difference in level between the surface of the tire side portion 1 and peaks of the uneven bars in the bar code 2. That is to say, the tire side portion 1 and peaks of the convex-concave bars are virtually flush with each other, whereby it is feasible to more positively suppress the occurrence of concentration of stress in the bar code 2. In order to avoid or suppress a difference in level as above, it may be devised to reduce to minimum or to zero (0) the thickness g of the base portion 5 of the bar code marking plate shown in FIGS. 2(A) to 2(C). Alternatively, it is possible to provide a cavity of depth substantially comparing to the thickness g in the inner face (die surface) of the vulcanization mold and fit or insert the bar code marking plate in the cavity. Preferably, the thickness g should not exceed 0.5 mm or, more preferably, 0.2 mm.

Further, according to the present invention, it is proposed that the bar code 2 provided using the marking plate 2° of FIG. 1 be of an elongate form having a pair of longitudinally extending side edges equally spaced from each other and joined at their ends by semi-circular arcs. It is also preferred that the longitudinally extending side edges of the bar code 2 be curved or arc-shaped as shown by FIG. 5. The bar code 2 provided using the marking plate 2' of FIG. 1 is of elongate form having a pair of equally spaced side edges which are preferably arc-shaped and joined by semi-circular ends.

Figure 4B:
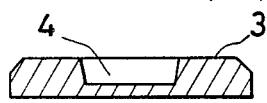

For reference, a crosssection of a bar code marking plate corresponding to a plate having a plate width larger than that a shown in FIG. 4(A) is shown in FIG. 4(B). In this type of plate, the width of the plate is increased to increase the width of the space portion 3 for the purpose of reducing the concentration of a stress occurring at a portion corresponding to the space portion 3, i.e., the above-mentioned flat portion. However, in this type of plate, cracking occurs at the flat portion and therefore no intended improvement is attained. Further, an extremely increased plate width gives an adverse effect on the appearance.

Figure 4C:

FIG. 4(C) shows a crosssection of a bar code marking plate corresponding to a plate having a bar portion width smaller than that as shown in FIG. 4(B). In this type of plate, the width of the bar portion is reduced to have a space portion width larger than that as shown in FIG. 4(B) for the purpose of reducing the concentration of a stress occurring at the side of a tire corresponding to the space portion 3. However, in this type of plate, cracking occurs at the space portion and therefore no intended improvement is attached. Further, an extremely reduced width of the bar portion unfavorably makes it impossible to differentiate the tires.

The present invention will now be described with reference to the following example.

EXAMPLE

With respect to the following tire of the present invention and conventional tire, the occurrence of cracking on the side of the tire was examined by the following method.

As a result, the occurrence of cracking was observed with respect to the conventional tire, while the tire of the present invention was free from the occurrence of cracking.

(1) Tire of the present invention:

The tire size was 145 SR 10. This tire was manufactured by mounting a bar code marking plate as shown in FIG. 1 on the inside surface of a vulcanizing mold, bringing the plate into contact with the side of a green tire and then vulcanizing the tire. The bar code marking plate had a sectional shape as shown in FIG. 2 (A) and its base portion 5 had a thickness g of 0.2 mm.

(2) Conventional tire:

The tire size was 145 SR 10. This tire was manufactured by mounting a bar code marking plate as shown in FIG. 3 on the inside surface of a vulcanizing mold, bringing the plate into contact with the side of a green tire and then vulcanizing the tire. The bar code marking plate had a sectional shape as shown in FIG. 4(A).

Method of test on the occurrence of cracking

A tire having a bar code provided on the side thereof was mounted on a rim and allowed to stand at a pneumatic pressure of 2.1 kg/cm$^2$ for 24 hr to maintain it in a steady state. Thereafter, the tire was allowed to stand for 24 hr within a hermetically sealed tank kept at 0° C. and having an ozone concentration of 100 ppm. Then, the presence of cracking was examined.

As described above, in the present invention, the bar portion of the bar code is extended to both side edges of the bar code and also it is made that there is substantially no difference in level present between the surface of the tire side portion and peaks of the uneven bars in the bar code, whereby it is feasible to eliminate such portions in which a concentration of stress is likely to occur and thereby realize an improvement in or relating to the weather resistance (particularly the static ozone resistance at low temperatures, for example at 0° C.) of tires.

I claim:

1. A rubber tire having a bar code stamped with a bar code plate into a sidewall portion thereof during vulcanization of a green tire, said bar code comprising a pair of side edges equally spaced one from the other and joined by semi-circular ends and a plurality of alternating grooves and ribs of varying widths wherein said ribs are formed at the same height level as said side portion of said tire and merge into said side portion of said tire at said side edges of said bar code whereby the surface of said ribs is continuous with the surface of said side portion of said tire.

2. A rubber tire as defined by claim 1, wherein said side edges of said bar code are arc-shaped.

* * * * *